INVENTOR.
BERTIL J. SUNDBERG

April 7, 1970 B. J. SUNDBERG 3,504,516
METAL PRODUCT AND METHOD AND MACHINE FOR MAKING SAME
Filed Aug. 24, 1964 13 Sheets-Sheet 4

INVENTOR.
BERTIL J. SUNDBERG
BY
ATTORNEYS

April 7, 1970  B. J. SUNDBERG  3,504,516
METAL PRODUCT AND METHOD AND MACHINE FOR MAKING SAME
Filed Aug. 24, 1964  13 Sheets-Sheet 6

FIG. 6

INVENTOR
BERTIL J. SUNDBERG
BY
Dugger Braddock Johnson & Westman
ATTORNEYS

April 7, 1970      B. J. SUNDBERG      3,504,516
METAL PRODUCT AND METHOD AND MACHINE FOR MAKING SAME
Filed Aug. 24, 1964      13 Sheets-Sheet 7
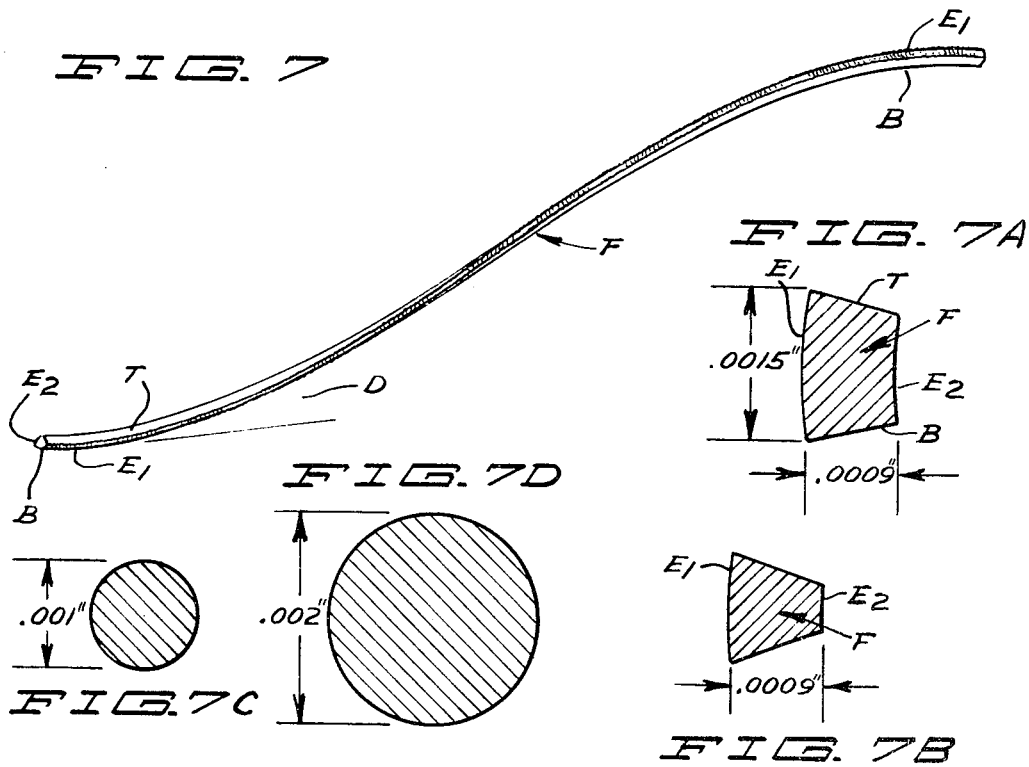
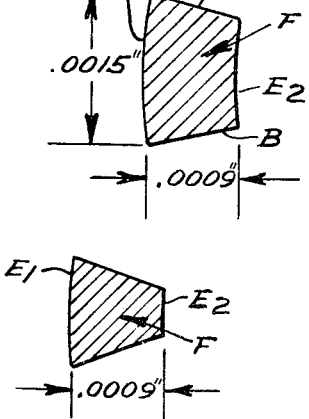
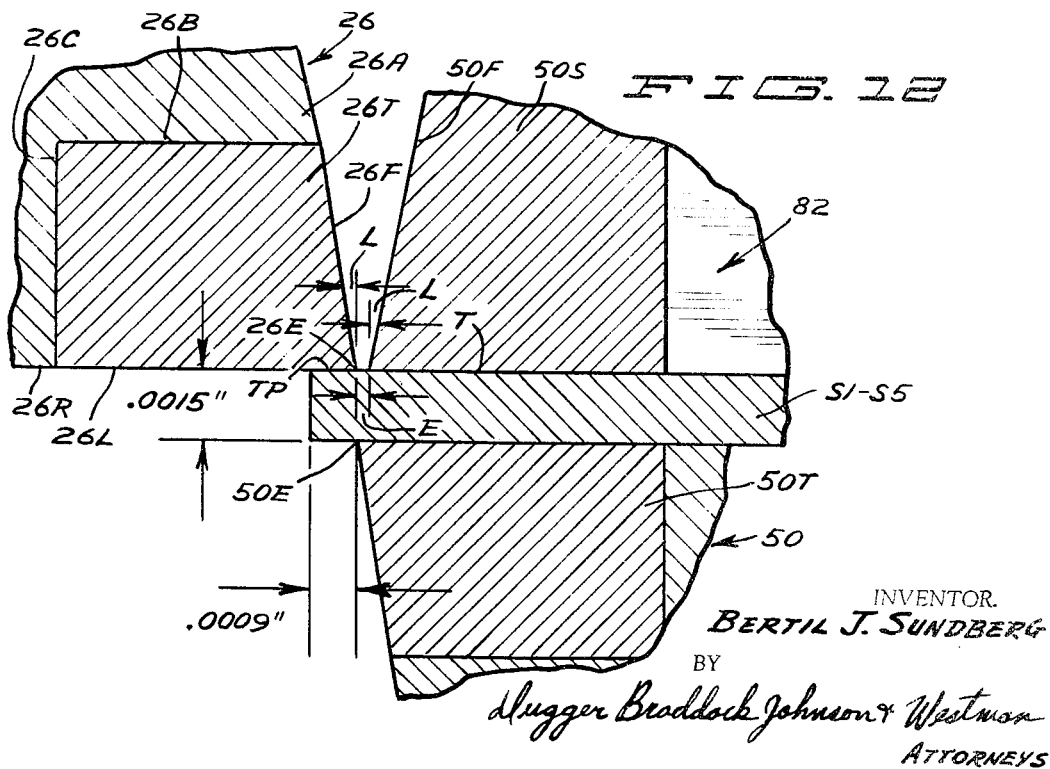
INVENTOR.
BERTIL J. SUNDBERG
BY
Dugger, Braddock, Johnson & Westman
ATTORNEYS

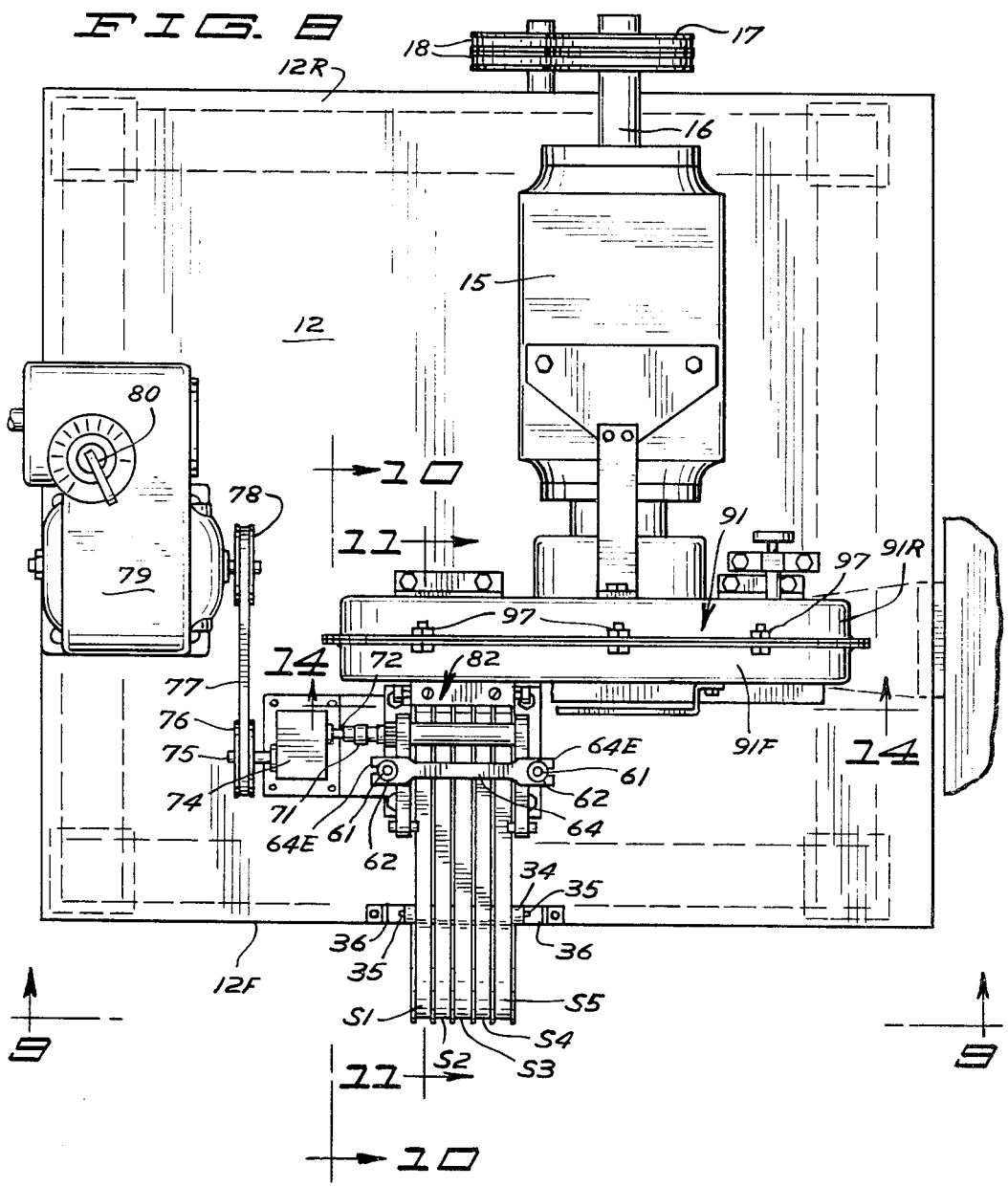

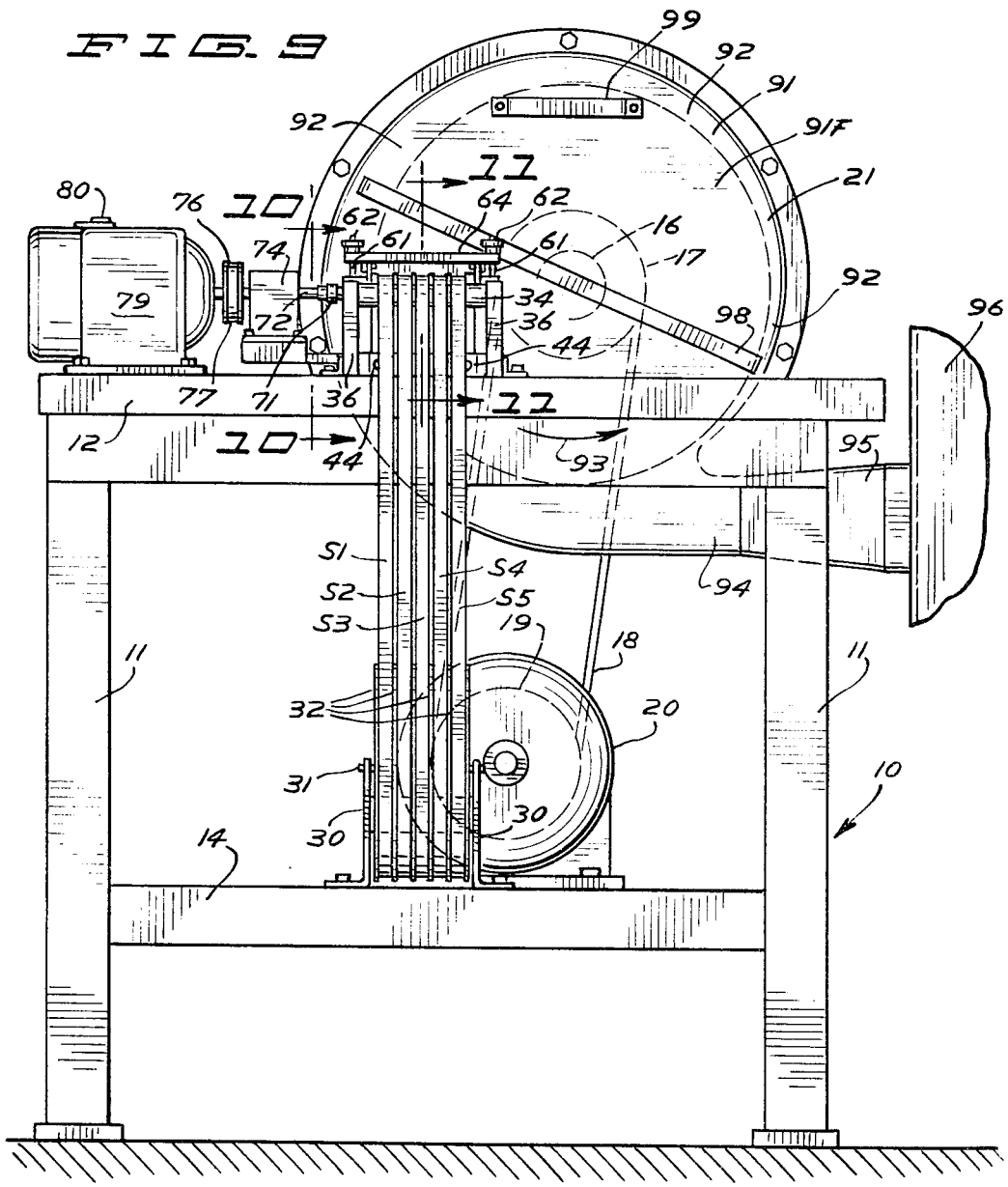

INVENTOR.
BERTIL J. SUNDBERG
BY
Dugger Braddock Johnson + Westman
ATTORNEYS

April 7, 1970     B. J. SUNDBERG     3,504,516

METAL PRODUCT AND METHOD AND MACHINE FOR MAKING SAME

Filed Aug. 24, 1964     13 Sheets-Sheet 11

INVENTOR.
BERTIL J. SUNDBERG
BY
Dugger Braddock Johnson & Westman
ATTORNEYS

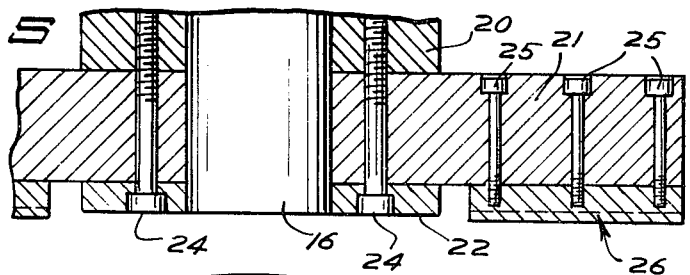
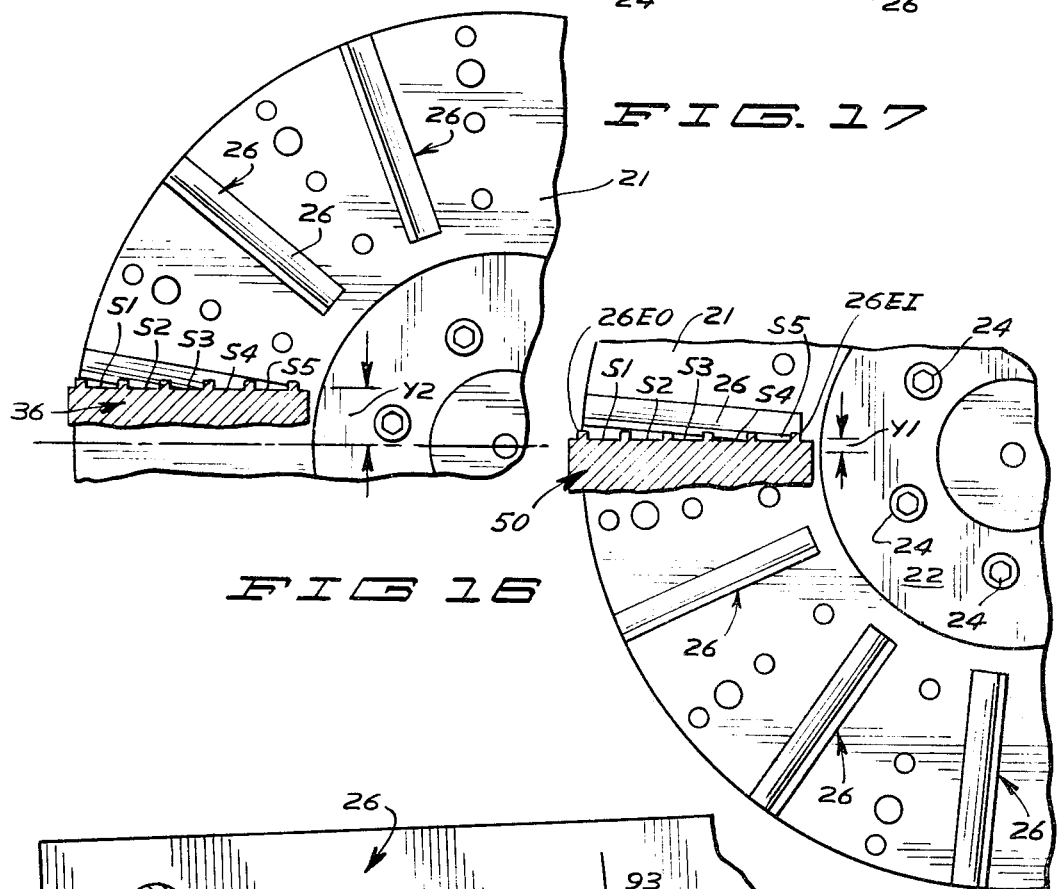
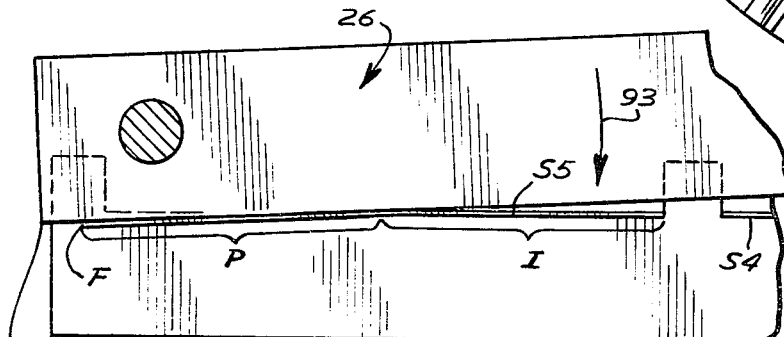

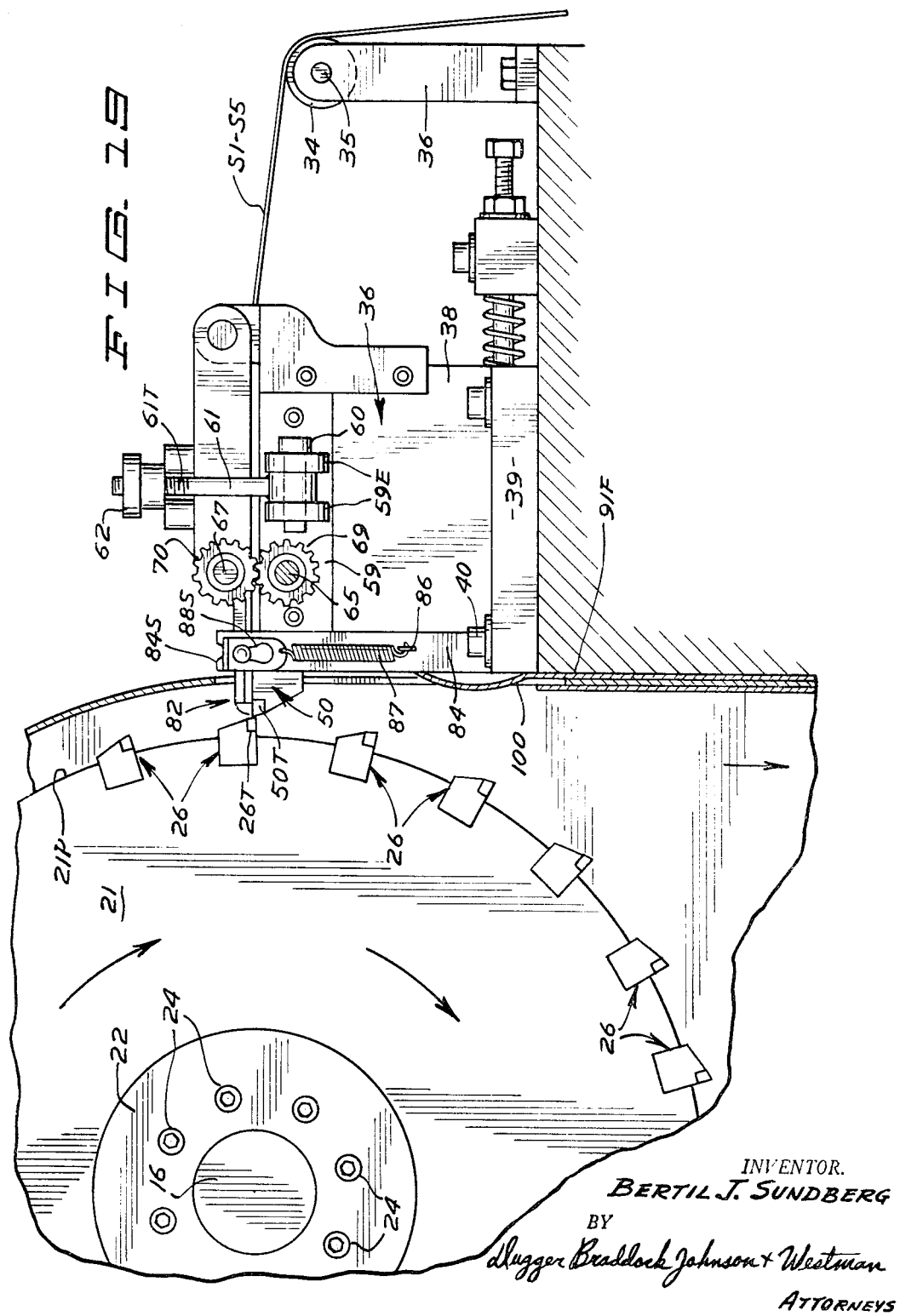

United States Patent Office 3,504,516
Patented Apr. 7, 1970

3,504,516
METAL PRODUCT AND METHOD AND
MACHINE FOR MAKING SAME
Bertil J. Sundberg, Minneapolis, Minn., assignor to
Brunswick Corporation, Chicago, Ill.
Filed Aug. 24, 1964, Ser. No. 391,707
Int. Cl. B21b 1/00
U.S. Cl. 72—203                                    4 Claims

ABSTRACT OF THE DISCLOSURE

A metal product made of fibrils of a thickness of about .001 inch to .005 inch and a transverse dimension of about .0005 inch to about .003 inch and method and apparatus for making said fibrils that includes means for supporting rolled strips of metal and guiding said strips, a stationary knife, a plurality of rotary knives, and means for feeding and retaining the strips adjacent the stationary knife to project beyond the edge thereof in positions to have the fibrils severed from the strips by the knives. In one embodiment, the rotary knives are mounted on a disc to extend generally radially relative the axis of rotation while in the other embodiment the rotary knives are mounted to extend generally parallel to the axis of the rotation.

---

This invention relates to an improved metal product, particularly discrete fibrils of metal, and especially to fibrils of exceedingly tough and hard metal, and to method and machine for making same.

Heretofore, there have been available in the metal arts fine metal fibers and a variety of methods and machines for making them. Some of the most common forms of metal fibers are the various metal "wools," for example, steel wool. There are a number of methods of making steel wool. The commonly used methods involve the cutting by means of a sharp-edged cutting tool of what is essentially a "shaving" of the metal from a very much larger size section, i.e., a wire or strip of the metal. As a consequence of these processes, the metal fibers of the same batch may be short or quite long, the surface of the "shaving" is rough, saw-toothed and characterized by great irregularity; and the whole of the fiber product will contain a considerable percentage by weight of burrs, slivers, and chips of all dimensions. In addition, the nature of manufacture effects the metal fiber, causing it to be breakable when stressed, and consequently small broken particles may slough off during further processing and use of the process. The metal "wools" produced by known processes are especially characterized by great variation between the finest filaments and largest filaments constituting a single batch. There has been no known way previously available for economically producing (small cross-sectioned) filaments of generally uniform cross-sectional area, other than by the wire drawing processes.

Of course, it is possible to draw wire, and such processes provide a very uniform product which is economical to manufacture in the larger wire sizes. For example, stainless steel wire having a diameter of .003 inch is commercially available at a price of about $12.50/pound. However, if the diameter of the same stainless steel wire is .002 inch, the price per pound of the product is increased almost 250%, i.e., to about $31.00/pound. If the same stainless steel wire is obtained in a diameter of .001 inch the price per pound is increased 930%, as compared with the price of the .003-inch product, to $116.00/pound. These very high prices of small diameter wires have, from the practical standpoint, made these materials practically unavailable for utilization in commercial devices, and the uses of such small cross-section filamentary metal materials has therefore been limited.

In some instances, efforts have been made to produce the smaller cross-sectioned filamentary metal materials by starting with a larger cross-section material, produce at reasonable cost by a known process. The larger size product is then etched to remove a layer from the exterior of the section, and thereby reduce the section. Such processes of obtaining small cross-sectional filamentary metal material are inherently expensive because of the large volume of material which has to be removed in order to obtain a slight reduction of transverse dimension.

According to the present invention fibrils of uniform desired length and having a cross-sectional dimension in the range of about .0005 inch to about .003 inch may be produced rapidly and at a cost substantially below the cost of any previously available small cross-sectioned fiber metal material other than fine steel wool. The fibrils so produced are clean, smooth enough for industrial purposes, they are of uniform practical length as produced and are separated from each other, they can be produced slightly twisted and slightly bent or nearly straight, as desired, they are free from any inordinate percentage of chips, burrs, slivers and the like, and are capable of being handled and used with great ease.

It is an object of the invention to provide such fibrils of metal, of the aforesaid dimensional ranges and characteristics.

It is a further object of the invention to provide fibrils of metal of the aforesaid dimensional range and characteristics and composed of exceedingly hard and tough materials which in larger sections are regarded as difficult to machine with cutting tools and especially fibrils of stainless steel and the like tough metals.

It is a further object of the invention to provide methods and machines for making the aforesaid metal fibrils.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURE 1 is an enlarged showing of the metal fibrils of the present invention;

Figure 3:
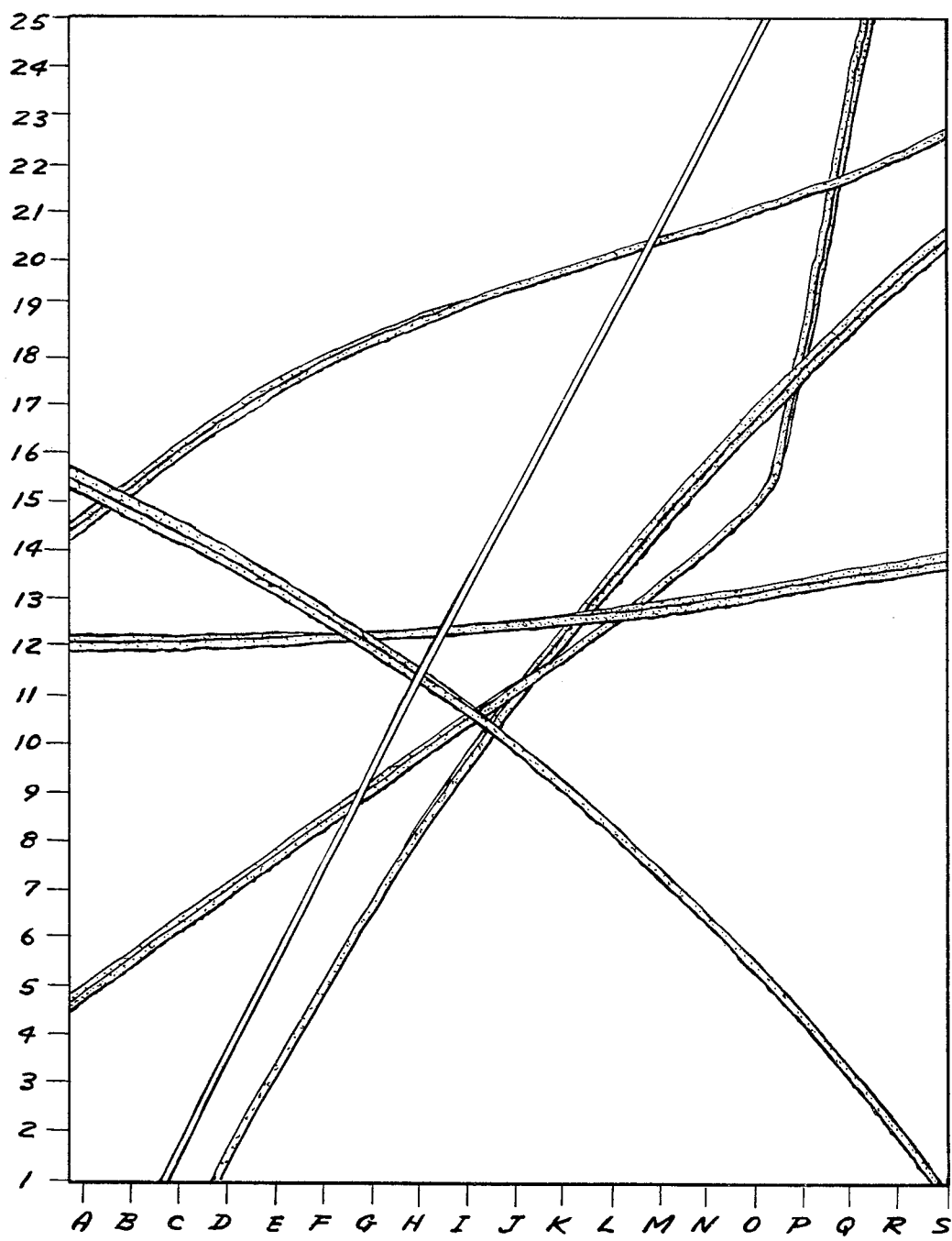

FIGURE 3 is a showing of several fibrils of the present invention on about the same scale as FIGURE 3. Also, in FIGURE 3, there is included a wire of .001" diameter, for size comparison. This wire begins at position B1 and extends diagonally upward and ends at approximately the N25 position.

Figure 4:
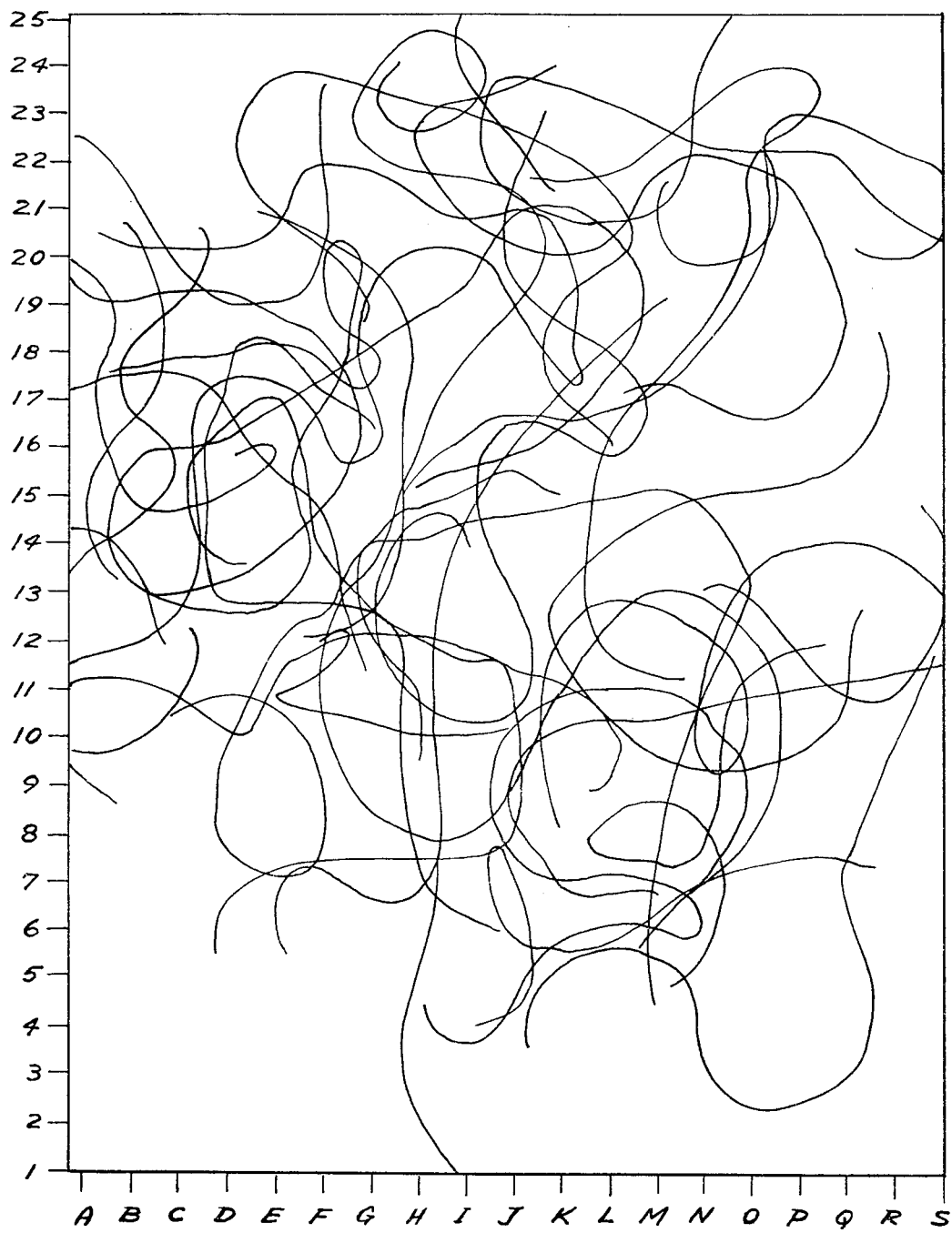
Figure 5:
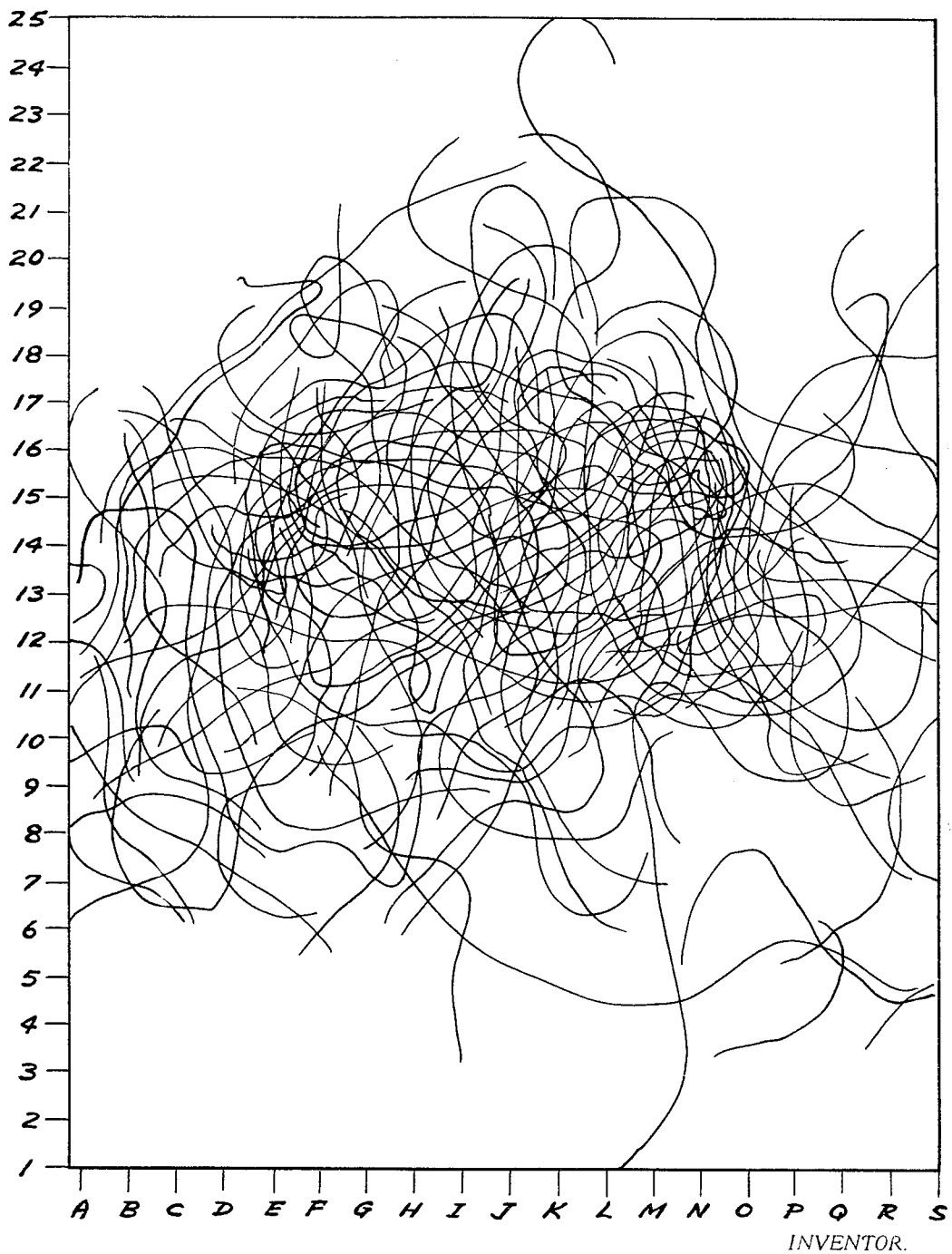

FIGURE 4 is a showing on about the same scale as FIGURE 1 that shows a group of metal fibrils of the present invention, randomly disposed. In the photograph from which this figure was made, the fibrils were held flat between glass slips, so as to maintain them within the range of focus of the camera with which the photograph was made;

FIGURE 5 is a showing of the fibrils of the present invention on about the same scale as FIGURE 1. In this figure, there is a greater concentration of fibrils then in FIGURE 4. In the photograph from which this figure was made, the fibrils were held between glass slips so as to maintain them within the range of focus of the camera with which the photograph was made;

FIGURE 6 is a photograph enlarged one hundred sixty times showing the cross section of a sample of fibrils of the present invention;

In each of FIGURES 1–5, coordinates transversely from A through S and vertically from 1 through 25 have been added to facilitate reference to particular areas of the photograph.

FIGURE 7 is a very much enlarged drawing of a portion of a length of one fibril of the present invention illustrating a representative type of cross section, bend and twist characteristic of such fibril.

FIGURES 7A–7D are cross-sectional views set adjacent to each other for comparison. FIGURES 7A and 7B show the cross sections of representative fibrils of the present invention. FIGURES 7C and 7D respectively, show a .002 inch diameter wire and a .001 inch diameter wire these being drawn to the same scale as FIGURE 7A and 7B.

FIGURE 8 is a plan view of one embodiment of machine of the present invention, used in making the metal fibrils product.

FIGURE 9 is a front elevational view of the machine shown in FIGURE 8, taken in the direction of arrows 9—9 of FIGURE 8.

Figure 10:
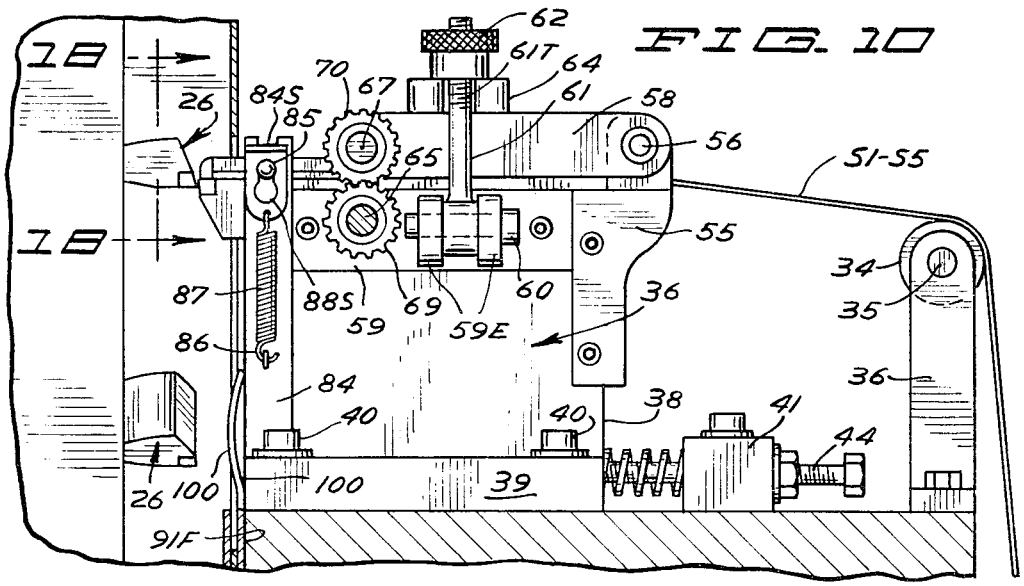

FIGURE 10 is an enlarged fragmentary side elevational view of the lower knife support and material feed portions of the machine shown in FIGURE 8, taken in the direction of arrows 10—10 of FIGURE 8.

Figure 11:
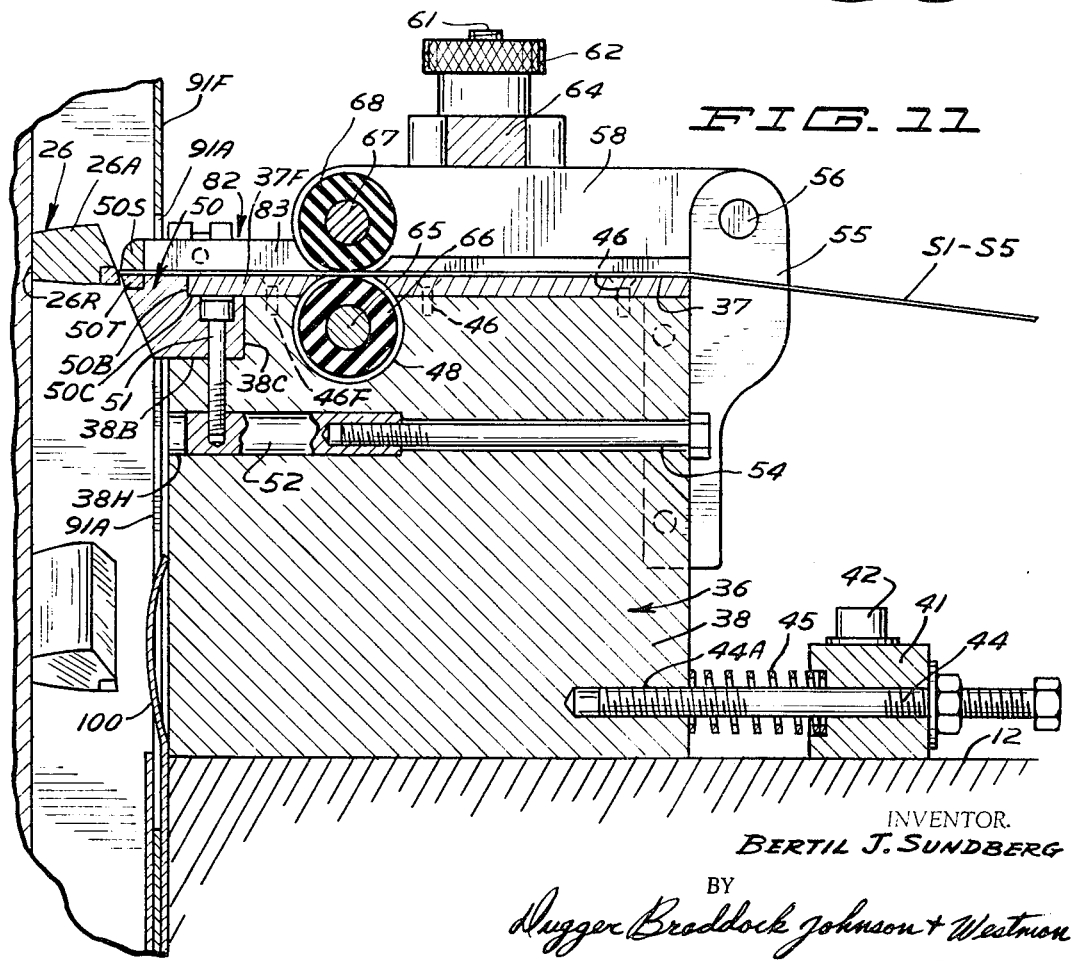

FIGURE 11 corresponds to FIGURE 10, except that it is an enlarged fragmentary sectional view taken in the direction of arrows 11—11 of FIGURE 8.

FIGURE 12 is a greatly enlarged fragmentary longitudinal sectional view of the stationary cutting knife and one of the movable cutting knives, of the present invention, being a portion of FIGURE 11.

Figure 13:
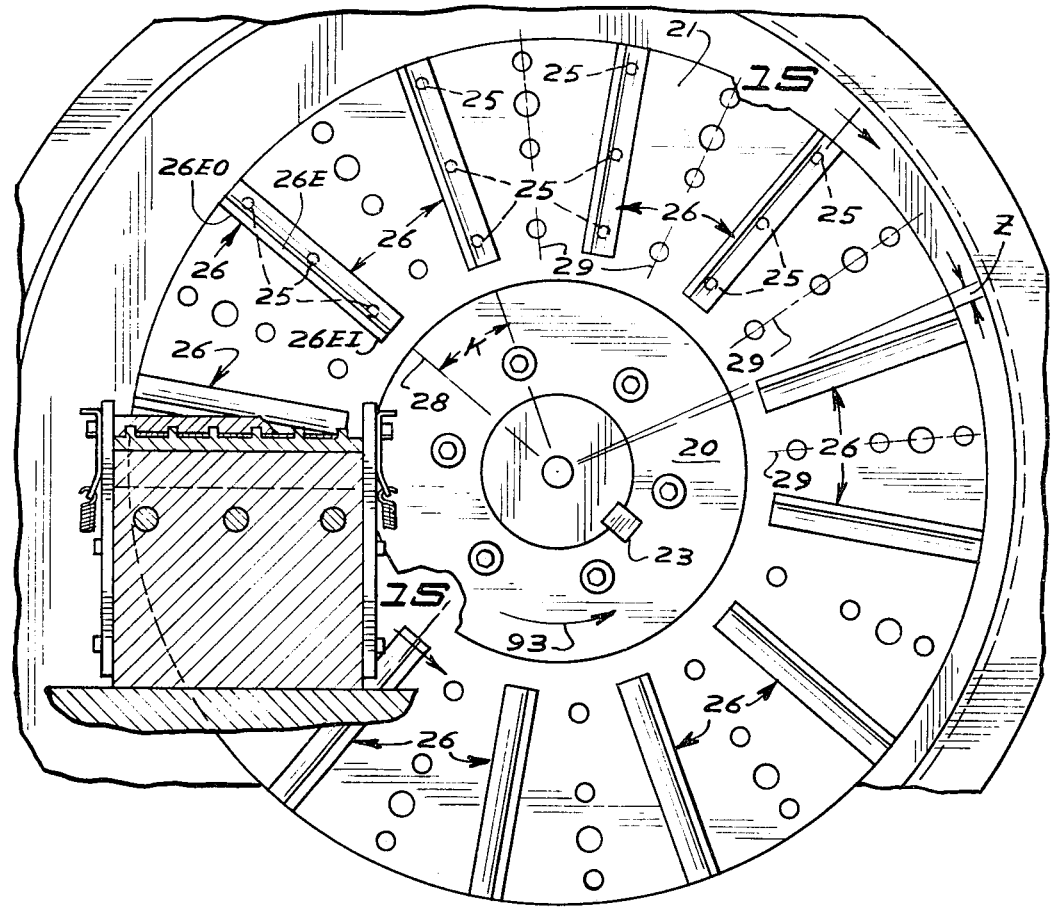

FIGURE 13 is an enlarged fragmentary transverse sectional view with certain portions of the machine removed, taken along the line and in the direction of arrow 13—13 of FIGURE 8.

Figure 14:
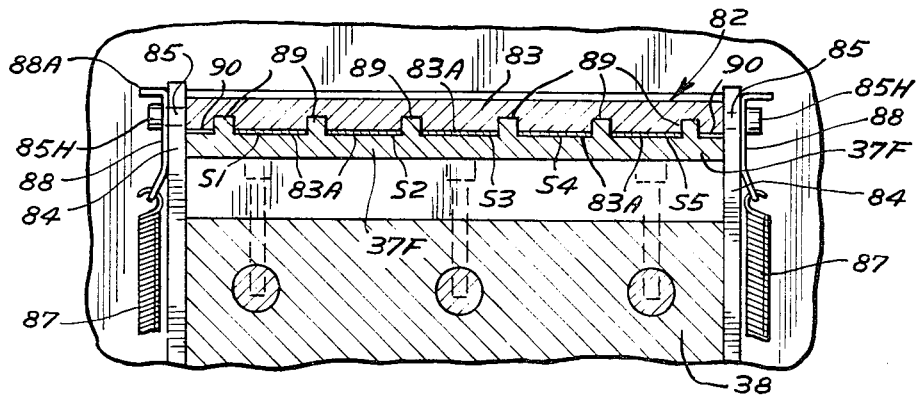

FIGURE 14 is a very much enlarged fragmentary transverse sectional view of the same section as shown in FIGURE 13, being that portion at arrows 14—14 of FIGURE 8.

FIGURE 15 is a fragmentary enlarged sectional view taken along the line and in the direction of arrows 15—15 of FIGURE 13.

FIGURE 16 is a fragmentary vertical sectional view, similar to a portion of FIGURE 13, showing one elevation of the stationary cutting knives, in relation to the moveable cutting knife.

FIGURE 17 is a fragmentary vertical sectional view corresponding to FIGURE 16, showing a slightly different embodiment of the invention wherein the stationary cutting knife is repositioned vertically with reference to the axis of rotation of the moveable cutting knives, FIGURE 17 being comparative to FIGURE 16.

FIGURE 18 is a very much enlarged fragmentary sectional view of the stationary and moveable cutting knives showing one fibril being cut, FIGURE 18 being taken in the direction of arrows 18—18 of FIGURE 10.

FIGURE 19 is a vertical sectional view of another embodiment of a machine of the present invention.

Throughout the drawings, corresponding numerals refer to the same parts.

METHOD

For producing the metallic fibrils of the present invention, there is first rolled a strip of metal having a width corresponding to the length of the fibrils ultimately desired to be produced. Normally, the strip is rolled to the required thickness dimension and then slit into strips of the desired width. Even very hard, tough metals can be rolled by known procedures. The width of the strip may range from as little as ⅛ inch to even 4–5 inches depending upon the length of the fibrils desired. A practical embodiment of the invention utilizes a strip of metal having a width of ¾ of one inch for producing fibrils of the same length. The strip of metal is rolled to a thickness, dimension equal to one of the dimensions of the cross section of the fibrils desired to be produced. Normally, the thickness of the strip will range from about .001 inch to about .003 inch, although in some instances strips having a thickness of about .005 inch may be utilized, where coarser fibrils are being produced. Therefore, as a first step in the method, the strip is rolled to a thickness equalling one of the cross-sectional dimensions of the fibril desired to be produced.

The invention may be utilized for the production of fibrils of many different kinds of metals, but it finds particular usefulness in the production of metallic fibrils of exceedingly tough and recalcitrant metals which, in larger dimensions, are regarded as being difficult to machine with cutting tools. Thus, many grades of stainless steel, as for example, what is known in the trade as 347 stainless steel, Inconel of various grades, manganese-steel alloys, titanium, indium, and many other very tough and recalcitrant metals, may be utilized. Pursuant this invention it has been found that these metals can be rolled economically whereas it is expensive to machine such metals with a cutting tool. Thus, exceedingly hard metals, such as the aforesaid 347 stainless steel, can be rolled at reasonable prices to dimensions of .0015 inch and even thinner dimensions.

Having this, pursuant the first step of the method of the invention produced a rolled strip of the metal, having a width equal to the length of the fibril desired to be produced, a single sheet thickness of the strip is then successively chopped off transversely across one end of the strip. Each individual piece thus severed from the strip is a fibril of this invention. The width of the individual fibrls, i.e., measurement in the direction longitudinally of the strip between the successive lines of severance provides one dimension of the cross-sectional area of the fibril being produced. Pursuant this invention, it has been discovered that successive lines of severance transversely of the strip may be made at distances along the strip separated as little as .0005 inch to .0009 inch, which is specifically illustrated, but greater distance between successive lines of severance may also be had, up to for example .003 inch and even more, where fibrils of greater cross-sectional area are desired. Normally, the "feed," i.e., the dimension between successive lines of severance and the thickness of the strip will not vary from each other more than 100%. Thus, for a fibril which has a dimension of say .0009 inch as illustrated along one dimension of the cross section would have a dimension of .0015 inch for the thickness of the strip. This will not necessarily be (and seldom is) exactly the other dimension of the cross section of the fibril since the fibrils are of varying cross-sectional shape. Where the strip is thicker, as for example, .003 inch, the dimension between successive lines of severance is likewise increased to say .002 inch. Of course, it will be understood that the advantages of the invention, in respect to the per pound cost of the fibril product being produced will be less for a fibril product of large cross sections, but the advantages of the invention in respect to uniformity of the fibril product, grain structure, freedom from burrs, chips, slivers and irregularities are available regardless of the size being produced.

Thus referring to FIGURES 7, 7A and 7B a fibril generally designated F, a portion of the length of which is shown in FIGURE 7, produced according to the present invention will have a length equal to the width of the strip. If the lines of severance is made at right angles to the width of the strip, which is the normal and preferred practice, the length of the fibril is equal to the width of the strip, but if the line of severance is diagonal to the length of the strip, and such is within the purview of the invention, the fibril will be longer than the width of the strip. As shown in FIGURES 7, 7A and 7B, the fibril F has cut faces E1 and E2 which result where the strip is severed, a top face T and a bottom face B. The top face T will correspond to the top of the strip, bottom face B corresponds to the bottom of the strip. Both of these faces T and B have the smooth-rolled-surface of the original strip metal. The face E1 is the face produced by one transverse severance of the strip, and the face E2 is the face produced by the next successive transverse severance of the strip. These faces show the effect of severance, but do not look quite like a shear cut. Various cross-sectional shapes may result, some being like FIGURE 7A, others like FIGURE 7B, and some nearly triangular in shape. Upon close examination of the cross-sectional shapes of the fibrils as shown in FIGURE 6, it will be seen that those located at I10, G13, N13 and O20 for example, while varying in size and shape, mostly resemble FIGURE 7A, while those of P5, L8 and G24 are nearly triangular more or less like FIGURE 7B. A clean shear-cut such as results when a strip is sheared off of the edge of a mild steel plate using a slow speed shear, while showing the imprint of the shear knives, will still be mostly rectangular in cross section, but in the present invention this is not true for the small sections shown. The sections vary from nearly triangular, as in FIGURE 7B to a squashed-down rectangle, as in FIGURE 7A. It is, of course, impossible to tell just what happens, because of the short interval speed of severing, as will be later explained.

In severing, the resulting fibril obtains a slight bend with reference to a straight line longitudinally through the fibril, as illustrated by the angle D in FIGURE 7 and also the fibril has a slight twist which is also illustrated in FIGURE 7 by the progressive spiral reorientation of the face E1, which at the left end of the fibril F as shown in FIGURE 7, is at the front surface whereas at the right end of the fibril this same surface is at the top, the bottom surface B being meanwhile brought around to the front position at the right end of the illustration of FIGURE 7.

FIGURES 7A and 7B illustrate the cross-section of several fibrils F produced according to the invention from a strip of 347 stainless steel having a thickness dimension of .0015 inch. The strip was moved lengthwise and transversely severed so as to produce the faces E1 and E2 which are spaced apart as shown by approximately .0009 inch. It is felt that fibrils having a dimension down to .002 inch diameter and in FIGURE 7D another circular 7B is less than in FIGURE 7A, even though both fibrils were produced in the same run. The width of the strip (corresponding to the length of the fibril) of which only a portion is shown in FIGURE 7 is ¾ of an inch.

FIGURE 7C and 7D are for purposes of comparison. FIGURE 7C illustrates a circular cross-section of a wire .002 inch diameter and in FIGURE 7D another circular wire .001 inch diameter. It is evident that the cross-sectional area of the fibril product of the invention (FIGURES 7A and 7B) is about the same as, or a little more than, the .001 inch wire of FIGURE 7D.

Wire of stainless steel, at present prices, costs about $31.00/pound for .002 inch diameter wire and approximately $116.50/pound for .001 inch diameter wire. In order to have a product capable of utilization, such wire must be chopped into lengths which would, increase the cost somewhat for the chopped wire product. The fibril product of the present invention, using rolled strip as the starting material can be produced at well below the cost of the .002 inch wire prior to chopping.

It will, therefore, be apparent that smallest size fibrils having the same order of magnitude of dimensions in cross-section, as those produced by prior processes, and also larger fibril product, can be produced by the present invention at very much less cost per pound as compared to prior process.

The word "shearing" is avoided in the present invention the word "severance" being used instead, because, while resembling shearing in some ways, the severance of the fibrils appears more to resemble a breaking off of the strip which is accomplished by sheer impact and in the very shortest time. As will be more fully explained hereinafter, the strip is advanced over a supporting edge and severance is accomplished by bringing against the upper face of the strip a succession of sharp cornered tools. These tools are moved along a path of motion which is normal to the plane of the strip and in a plane coinciding with the edge of the support over which the strip is advanced. The tool thus brought in succession against the upper surface of the strip pass the supporting edge with almost zero clearance and at a speed of 6000 to 10,000 feet per minute, i.e., 100–175 feet/second, whereby each such tool delivers, against the overhanging upper edge of the strip, a blow which in each instance has a duration of about .00015 to .0003 second. During this minute time interval severance of the overhanging end of the strip is completely accomplished. The impact is so great that the overhanging end of the strip is apparently simply broken off by the impact of the tool and in so doing the resultant fibril is deformed, as compared to the original thickness of the strip. Insofar as the foregoing constitutes a theory of operation, it is intended as merely an explanation and not as a limitation upon the invention.

In any event the fibrils are produced. They are individual, usually slightly bent and very slightly twisted and substantially free from burrs, chips, slivers and trash. The feed of the strip is adjusted so that the distance the strip is advanced lengthwise over the supporting edge between successive blows of the moveable tools is not substantially more than twice the thickness of the strip and the distance between lines of severance are thus adjusted.

The resultant fibrils have good "loft"; that is, they will easily form a matt of very low density. In addition, the bend and spiral plus the cross-sectional shape peculiar to the product insures every conceivable kind of inter-fibril contact, of which can be mentioned, point contact spaced point contact, line contact, spaced line contact and planar contact. In a pile of fibrils as in FIGURES 4 and 5, all of these kinds of contacts randomly occur.

In the method of the invention the starting material is first rolled to produce the desired thinness of strip metal which is then, according to another step, severed transversely to the length of the strip, to produce the fibril product. The rolling of the strip produces an elongation of grain in the direction of rolling, i.e., lengthwise of the strip. The line of severance of the fibril is transverse to the length of the strip and hence is transverse to the direction of grain elongation. The direction is therefore transverse to the length of the fibril. It is believed that the severance of the fibril produces additional working of the metal, but whether this produces a change of the grain structure in the fibril per se, is not known. It is known that the fibrils exhibit strength in tension, which for the cross-section involved is of the same order of magnitude as the strength in tension of the strip.

MACHINE

Referring to the drawings, one embodiment of machine of the present invention comprises a frame generally designated 10 having legs 11—11, and a top 12. The frame is braced at 14, such braces form a lower platform on which certain portions of the machine are mounted. On the top 12 there is mounted a massive bearing 15 of the highest quality, capable of operating at zero clearance for rotatably supporting the shaft 16. Pre-loaded precision ball bearings are preferred. The shaft 16 overhangs the rear edge 12R of the table and is provided with a multiple groove V-belt pulley 17 on which the belts 18 run. The belts 18 run down to pulley 19 which is on motor 20 mounted on the bracing 14. In a typical embodiment the shaft 16 is driven at 1700 r.p.m.

At the forward end of the shaft 16 there is a heavy flange 20, see FIGURE 15, the shaft 16 protruding through the flange. On the flange there is bolted a heavy circular wheel 21, which is held in place by the collar 22, which is in turn pulled down tightly by the cap screw 24, that are recessed into apertures in collar 22. At evenly spaced radial positions around the wheel 21 there are provided apertures through which the fastening cap screws 25 extend. These cap screws are threaded into the rear face of identical tools generally designated 26. In the illustrated embodiment of the machine of the invention there are provided twelve such identical tools 26 on the wheel 21, each of the tools being set radially in respect to the apertures through which the screws 25 pass and the radial positions of successive knives are spaced apart by the angle K, see FIGURE 13.

Each of the tools 26 has a shape as shown in FIGURES 10, 11, 12, 13, 16 and 17. Referring particularly to FIGURE 13, it will be noticed that the tools 26 have a uniform width throughout their radial length that is to say from the inner end to the outer end, and the cross-sectional shape of the tools are also uniform, as shown in FIGURE 11, which illustrates a cross-section through one such tool. Referring to FIGURE 12, the tool 26 has a massive body portion 26A which is machined so as to provide surfaces 26B and 26C which therefore forms a groove along the leading edge of the tool body. A piece of tungsten carbide 26T is positioned in this groove and is held in place by brazing. The tungsten carbide is very hard, and its lower edge 26L coincides with the lower edge 26K of the tool body, this surface 26L–26K being ground flat. The rear surface 26R of the tool body (see FIGURE 11) fits directly against the surface of the wheel 21, and is held in place by the cap screws 25. The forward edge 26F (see FIGURE 12) is likewise ground but this edge has a rearward rake angle L, of approximately 15°. All of the tools 26 are identical and after being fastened in place on the wheel 21, they are sharpened while in place on the wheel, so that the cutting edges 26E of all of the tools, formed by the junctions of the surfaces 26F and 26L of the tools are identical. It will be noted that the cutting edge 26E of each tool is parallel to the radius through the centers of the bolts 25 which hold and position the tool and, therefore, the inner end 26EI of the cutting edge 26E (see FIGURES 16 and 18) in effect travels slightly ahead of the outer end 26EO of the same edge. This produces a concentration of force for the severing action.

On the wheel 21 there are also provided apertures along radii 29, these being spare apertures, for the employment of additional tools, if desired.

As shown in FIGURES 8–11, on the frame bracing 14 there are mounted spaced brackets 30—30 in which a spindle 31 is removably received, and upon the spindle there are placed a plurality of coils 32 of the previously rolled metal strips S1–S5. These strips S1–S5 of metal run parallel to each other upwardly from the rolls and pass over a guide roller 34 which is pivotally mounted by means of the pin 35 on the brackets 36, the brackets being bolted to the forward edge 12F of the top 12. The strips then pass along a path of motion, as shown in FIGURES 10 and 11, and enter upon a flat path of travel defined by the planar surface provided by bedplate 37, extension 37F and stationary knife 50 which terminates at supporting edge 50E, see FIGURE 12, all being a part of the feed mechanism and stationary knife support generally designated 36. The mechanism 36 is mounted on table 12, so that it can be moved toward and away from the wheel 21, carrying the tools 26. The mechanism 36 has a massive frame 38 having edge flanges 39 through which cap screws 40 are provided at each side of the frame 38 for bolting mechanism 36 firmly in place. In front of the frame 38 there is a block 41 which is solidly attached to the table top 12 by means of the cap screws 42. This block has apertures to receive two adjustment screws 44 which are threaded at 44A into the lower portion of the massive frame 38 of the feed mechanism and stationary knife support 36. Between the frame 38 and the block 41 there are provided heavy springs 45 which normally bias the block 38 to the left as shown in FIGURE 11, i.e., toward the wheel 21. Contrary movement is provided by tightening the screw 44. Since there are two adjustment screws 44, see FIGURE 9, the block 38 may be skewed slightly, within the limits of its mounting for adjustment purposes, and after adjustment is complete the screws 40 are tightened at opposite sides of the frame 38 and the entire frame 38 is thus held immovably on the table top 12 and hence with reference to the plane of rotation of the edges 26E of the tools 26 on wheel 21.

The planar supporting surface, plate 37 is held in place by fastening screws 46. It is noted that the underside of the plate 37 and the adjacent portion of the frame block 38 are transversely milled out to provide the cylindrical aperture 48. Forward of the aperture 48 there is a separate forward extension plate at 37F which is fastened by the screws 46F.

At the forward edge the frame 38 is milled out to provide the surfaces 38B and 38C on which a knife edge tool 50 is detachably secured by means of the hold-down cap screws 51. It will be noted that the cross-section shape of the stationary tool 50 is milled off to provide the surfaces 50B and 50C into which the forward end of the front extension plate 37F laps, so as to cover the heads of the screws 51. The tool 50 is, therefore, a continuation of the surface of plate 37 and 37F and terminates at edge 50E, see FIGURE 12. The tool 50, like the movable tools 26, is fitted with a tungsten carbide hard metal insert 50T, which is best shown in FIGURE 12. Into the frame block 38, at the forward edge, there are bored holes 38H in which there slide the cylindrical slugs 52. These slugs 52 serve as a slideable "nut" into which the lower end of the hold-down cap screws 51 for the tool 50, are threaded to receive the cap screws 54, and hence when the screws 54 are tightened, they will pull the slugs 52 to the right as shown in FIGURE 11, and since the hold-down screws 51 of the stationary tool 50 are threaded into the cylindrical slugs 52, the screws 51, and hence also the stationary tool, will be pulled to the right as shown in FIGURE 11, and hence solidly against the surface 38C. This is done after the screws 51 have been pulled down snugly, but not fully tightened, and hence the tool 50 will be pulled solidly against the surface 38C, after which the screws 51 can then be tightened and this pulls the tool 50 solidly against the surface 38B. The forward extension 37F of the plate 37 is then put in place and fastened by means of the screws 46F.

At the rear of the frame 38 there are upwardly extending brackets 55 which serve to mount the pivot 56 on which the arm 58 extends forwardly. At the sides of the frame 38 there are side plates 59, see FIGURE 10, and a similar side plate is provided at the opposite side of the frame 38. From each of these side plates there are outwardly extending ears 59E as shown for one side in FIGURE 10. These serve to receive pivot pins 60 upon which the lower apertured end of the bolts 61 are mounted for swinging movement. The upper ends of the bolts 61 are threaded at 61T to receive the nuts 62. The bolts 61 receive the bifurcated ends 64E of the hold-down bar 64, which reaches across and hence holds-down the two arms 58.

The side plates 59, are apertured to receive a shaft 65, see FIGURES 10 and 11, on which the lower feed roller 66 is mounted for rotation with the shaft. The roller may conveniently be made of rubber, which is vulcanized to the shaft. Similarly, upon the forward end of the arm 58 (to the left as shown in FIGURES 10 and 11) there are pivotally mounted the shaft 67 which carry the upper feed rollers 68 which is also of rubber. Upon the proximate ends of the shafts 65 and 67 there are provided gears 69 and 70, respectively, which mesh as shown in FIG- URE 10. The lower shaft 65 is coupled through a self-aligning coupling 71 to the output shaft 72 of a speed reducer 74, having a high speed input shaft 75 carrying pulley 76 on which the belt 77 runs, the belt 77 also passing over the pulley 78 on the motor 79. The motor has a speed regulator at 80.

By means of this drive arrangement, the rate of rotation of the feed roll shaft 65 and 67, and hence of the feed rolls 66 and 68 respectively, can be closely regulated, for feeding the strips S1–S5 at any desired rate of feed. The pressure of the upper feed roller 68, downwardly upon the strips S1–S5 may be adjusted by turning the nuts 61. When it is desired to open the arrangement, the nuts 62 are loosened and the upper ends of the bolts 61 are swung outwardly, thus permitting the cross-bar 64 to be removed. When this is done, the arms 58 may be swung upwardly, in a clockwise direction as shown in FIGURES 10 and 11, thus clearing the upper portion of the feeder 30 for threading the strips S1–S5 therethrough, maintenance, etc.

At the forward end of the feeder 36, which is to say at the left side of FIGURES 10 and 11, there is superimposed on the strips S1–S5 a multiple slideway, generally designated 82. This slideway, a section of which is shown in FIGURE 14, contains a plate 83 which extends across the full width of the feed mechanism and stationary knife support 36 and from about roll 68 to its left edge 50S as shown in FIGURE 11. At opposite sides of the frame piece 38 there are upwardly extending brackets 84, having vertical slots 84S in their upper ends. At opposite ends of the slideway plate 83 there are outwardly extending pins 85—85 which have heads 85H at their outer ends. From a lower hook 86 on each of the brackets 84, see FIGURE 10, there extend upwardly a spring 87, and the upper ends of these springs are hooked into apertures in the lower ends of clips 88 each of which has a key hole slot 88S, see FIGURE 10, through which the head 85H of the pin may be entered, after which the springs 87 will pull downwardly on the clips 88 and hence upon the pins 85 thereby holding plate 83 (generally 82) down with force. The upper ends of the fasteners 88 are bent outwardly at 88A, for convenience of manipulation.

The underside of the slideway plate 83 is provided with grooves into which bars 89 are set, these bars being extended down to the lower surface of the plate 83, and below the surfaces 83A. In this way, there are defined transverse downwardly open slideways through which the strips S1–S5 may slide endwise. The thickness dimension of the bearing bars 89 is carefully controlled so that when these bearing bars are down tightly against the upper surface of plates 37, 378 and 50–50E there will be only very slight clearance at 90—90 between the underside of the entire arrangement 82, and the upper surface 37—37—50—50E. In this way, the strips S1–S5 are guided parallel, and at the same time pressure is exerted upon the upper faces of the strips to hold them firmly. It will be appreciated that a strip of metal having a thickness of for example .0015 inch, is very thin and will not have much strength to resist bending when it is pushed along longitudinally of the strip. Consequently, it is desirable that the feed rollers 66–68 be relatively close to the position at which the strips reach the supporting edge 50E of the stationary support 50. Also, as a further aid in resisting deformation of the strips as they are pushed along, the upper support slideway generally designated 82 is provided at its forward end with a metal nose 50S which is ground off to provide a front face 50F slanted back, as compared to the direction of motion of the strip S1–S5, by a rake angle of about the same amount L, as the rake angle of the hard metal piece 26T of the movable cutting tools 26, see FIGURE 12. It will also be noted that the dimension E between the most forward portion of the nose 50S, and the most forward portion 50E of the stationary support 50 is very minute, being only a fraction of the thickness of the strip S1–S5, and hence only a part of a thousandth of an inch. Consequently, the hold down force upon the strips S1–S5 is continued right up to the place where fracture of the strips occurs to produce severance, there being no place along the length of the strip, between the feed rollers 60–68 and nose surface 50F, where the strips are unsupported against deformation from the plain of the strips.

Around the entire wheel 21 there is provided a housing generally designated 91 which is built in the form of a scroll-shaped blower housing, as shown in FIGURE 9. Rotation of wheel 21 is shown at arrow 93. Thus, by comparing the periphery of the wheel 21 with the shape of the housing 91, it will be seen in FIGURE 9, that within the housing 91 and beginning at horn 94 and proceeding counterclockwise there is a clearance space 92 of increasing dimension in such counterclockwise direction, and that this space eventuates in the outlet horn 94. After passing through the expanding section 95, for reduction of velocity, air passing through the housing delivers to the closed container 96. The front portion 91F of the housing is detachably secured to the rear portion 91R by means of the bolts 97 and the front is provided with handles 98–99. The front 91F of the housing is provided with an aperture 91A, see FIGURE 11, and a small shield 100, is provided on the front of the housing, and bears against the front of the frame piece 38 of the feed mechanism and stationary knife support 36. This is the left as shown in FIGURES 10 and 11. The tools 26 being set radially on the wheel 21, act as fan blades and a strong circulation of air enters through the opening 91A, around the stationary knife 50 and the sheared off fibrils are immediately and individually carried away by the strong current of air and thrown out of the delivery horn 94–95 and into the container 96 for collection.

Referring to FIGURE 16 and 17, it will be noticed that in FIGURE 16, the level of the strips S1–S5 is displaced by the dimension Y1 above the level of the centerline of the shaft 26. In FIGURE 17 the displacement Y2 is made greater. This means that the inner end 26EI of the moveable tool 26E will first engage the right hand edge of the strip S5 as shown in FIGURE 16, and progressively move across strip S5 in a direction to the left as shown in FIGURE 16 for severing a fibril therefrom. The action progresses radially outwardly (with reference to the tools 26 on wheel 21). Referring to FIGURE 18, it should be borne in mind that this view is from the opposite direction from that shown in FIGURE 16, the center of the wheel 21 carrying the moveable tools 26 being well to the left of the view as shown in FIGURE 18. The moveable tool 26 is shown in the process of severing a fibril F from the strip S5 a portion shown over bracket P of the fibril being already severed while the portion shown over the bracket I is still integral with the strip S5. As movement of the tool 26 continues in the direction of rotation, i.e., in the direction of arrow 93 of FIGURE 17, the severance of fibril F is completed across the full width of the strip S5, thus liberating the fibril. Almost immediately the tool 26 begins its action across the proximate edge of the next strip S4. The severing action continues across the full width of strip S4, and in succession across the strips S3, S2 and S1, after which the tool 26 leaves the location of the stationary support 50, and continues a full revolution of the wheel 21. This allows edge 26E of such tool to cool. Other tools 26 follow in succession. The steady rotation of the feeding mechanism, i.e., rollers 66–68, can be adjusted by regulating speed of motor at control 80, and the feeder rollers cause all of the strips simultaneously to advance, and they are projected enough so as to have a dimension of .0009–.005 inch of the length of the strips overhanging beyond the edge 50E before the next tool 26 begins its severing action. It will, of course, be appreciated that the amount of movement of the strips S1–S5 longitudinally between successive engagements by the successive movable tools 26 determines one of the cross-sectional dimensions of the fibril which is being produced, the thickness of the strips S1–S5 determining the other dimension of such cross section. The amount of feed for a strip of for example .0015 inch thickness would be in the range of about .0005 inch to about .0012 inch and as shown in the photographs .0009.

The exact mechanism by which severance of the fibrils is accomplished is not fully understood. It is known that the severed faces which is to say the faces E1 and E2 of the fibril F when powerfully magnified have somewhat (but not quite) the appearance of a sheared edge. Such edges, to some degree, resemble disruption of the metal, as by rupture. It will be appreciated that the impact of the movable tools 26 upon the upper projecting portion TP of the top surface T of the strip S1–S5 as shown in FIGURE 12, will be enormous and of exceedingly short duration. Movable tools are mounted upon the heavy wheel 21 and are thus propelled at enormous rate of speed, and the energy applied to the projecting portion TP of the strip is the energy of impact, the time interval of application being only .00015–.00030 seconds in a typical case. The energy of impact is thus enormous in respect to the section being severed. At any rate, the fibril is cleanly separated from the adjacent portion of the strip S1–S5, and although a highly magnified picture of the thus exposed surfaces is not as shiny as the surfaces T and S of the strip, they are still quite bright.

It is important in carrying out the method of the invention and to the successful operation of the machine that the stationary supporting edge 50E and the edges 26E of the movable tools be kept very sharp, and that they be run with substantially zero clearance with reference to each other. It is, therefore, important that the bearings within the structure 15 for rotatably supporting the shaft 16 be of the very finest quality, and that the wheel 21 be very strong and rugged, so as to permit no deflection, and that the mounting of the stationary support 50 be massive and of exceedingly rugged construction, and that the entire frame 12 be massive so as to permit no deflection during operation. When these requisites are heeded, the resultant fibril product severed from the strips will be free from chips and slivers, they will be of uniform length completely separated from each other, and each having a slight bend and twist. The fibrils have good loft when piled together, they are less subject to breakage when worked or pressed, and are suitable for many applications for which there was previously no known economical source of supply. In addition, the product is produced at what is, as compared to the prior art, an exceedingly low cost.

Referring to FIGURE 17, this figure corresponds to FIGURE 16, except the position of the stationary support generally designated 36 is elevated by amount Y2 with reference to that shown in FIGURE 18, and as a result, the moveable tools 26 on the wheel 21 will approach the edge of the strip S1–S5 at a greater angle of attack than as shown in FIGURE 16. Consequently, the resultant fibril products will have more bend and twist than as produced on the machine shown in FIGURE 16. This is desirable for some uses. It is thus within the purview of the invention to change position of the stationary support relative to the axis of rotation of the wheel 21, for varying the product.

It is believed that the cleanness and freedom from chips, slivers, burrs and flakes of the resultant metallic fibril product of this invention and its uniformity may be due to the fact that there are a plurality of moveable tools 26 separated from each other, and that these run in succession in respect to the strips being sheared. As a consequence after a given one of the tools 26 has done its work, it will be idle while continuing around the complete path of rotation and its edge 26E is given an opportunity to cool off.

FIGURE 19 illustrates another slightly modified embodiment of the invention which is in all respects similar to that illustrated in FIGURES 8–18, except that the shaft 15 extends transversely with respect to the length of the strips S1–S5, and the plane of the wheel 21 is parallel to the length of the strips S1–S5, and moveable tools 26 are set in periphery 21P of the wheel 21 rather than radially along the face of the wheel. The axis of the shaft 16 is preferably substantially in the plane of the strips S1–S5 as they emerge between the stationary support 50 and the guideway mechanism 82. If desired, the moveable tools 26 can be set so as to be spiral in respect to the axis of the shaft 16, in which event the cutting action will be substantially identical to that of the machine illustrated in FIGURES 8–18. Where the tools 26 are set with their edges 26E parallel to the axis of the shaft 16 the severance of the fibrils from the emerging ends of the strips S1–S5 takes place substantially simultaneously across the full width of each of the strips and the fibrils consequently have less bend and spiral configuration than where they are severed by a progressive action across the width of the strips.

PRODUCT

Figure 2:
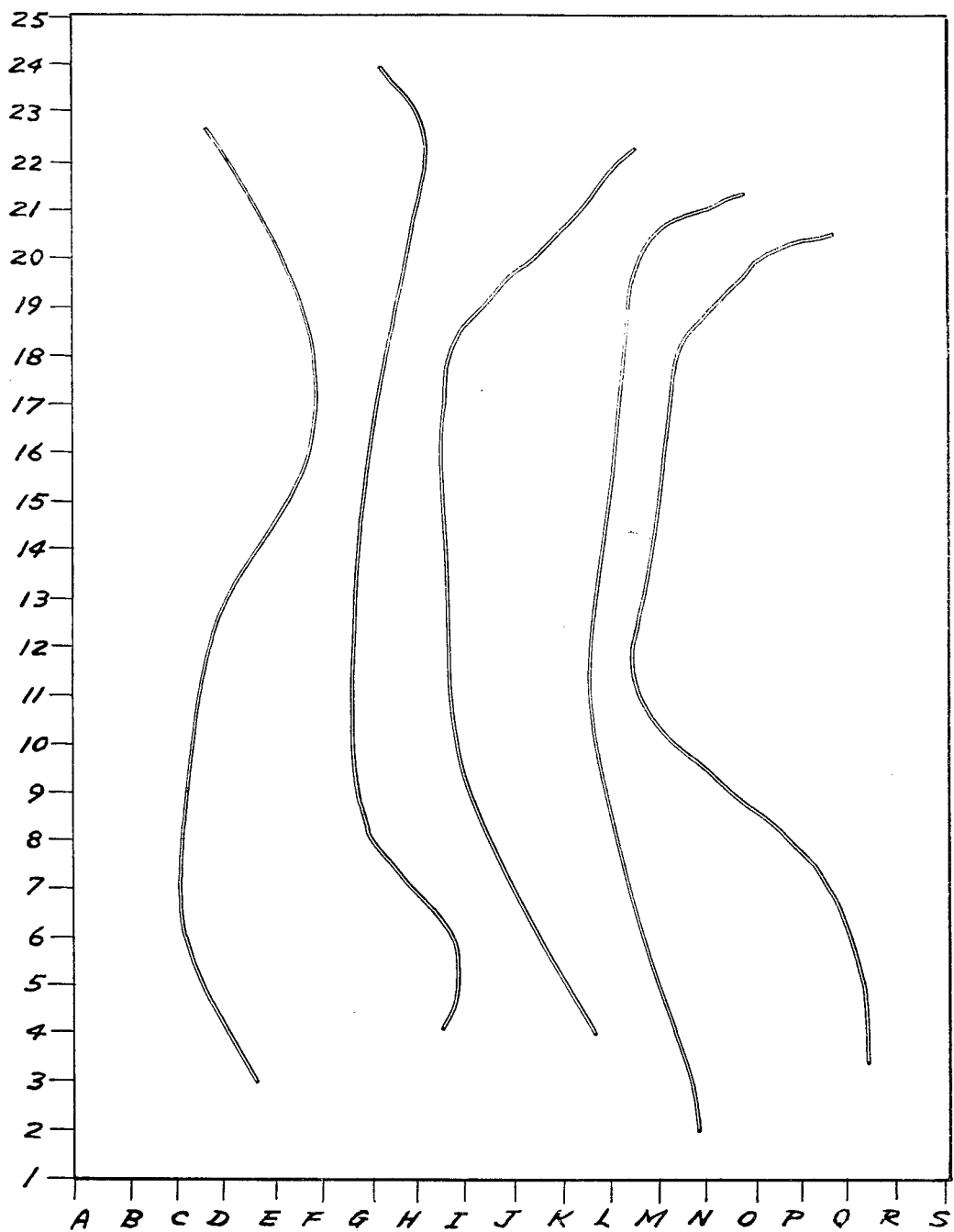
FIGURE 2 is a showing of three fibrils of the present invention on a much larger scale than that of FIGURE 1. This figure also shows at the right side, extending vertically above coordinate P-Q a wire of .001" diameter, which is included in this figure for purposes of size comparison.
Figure 2:
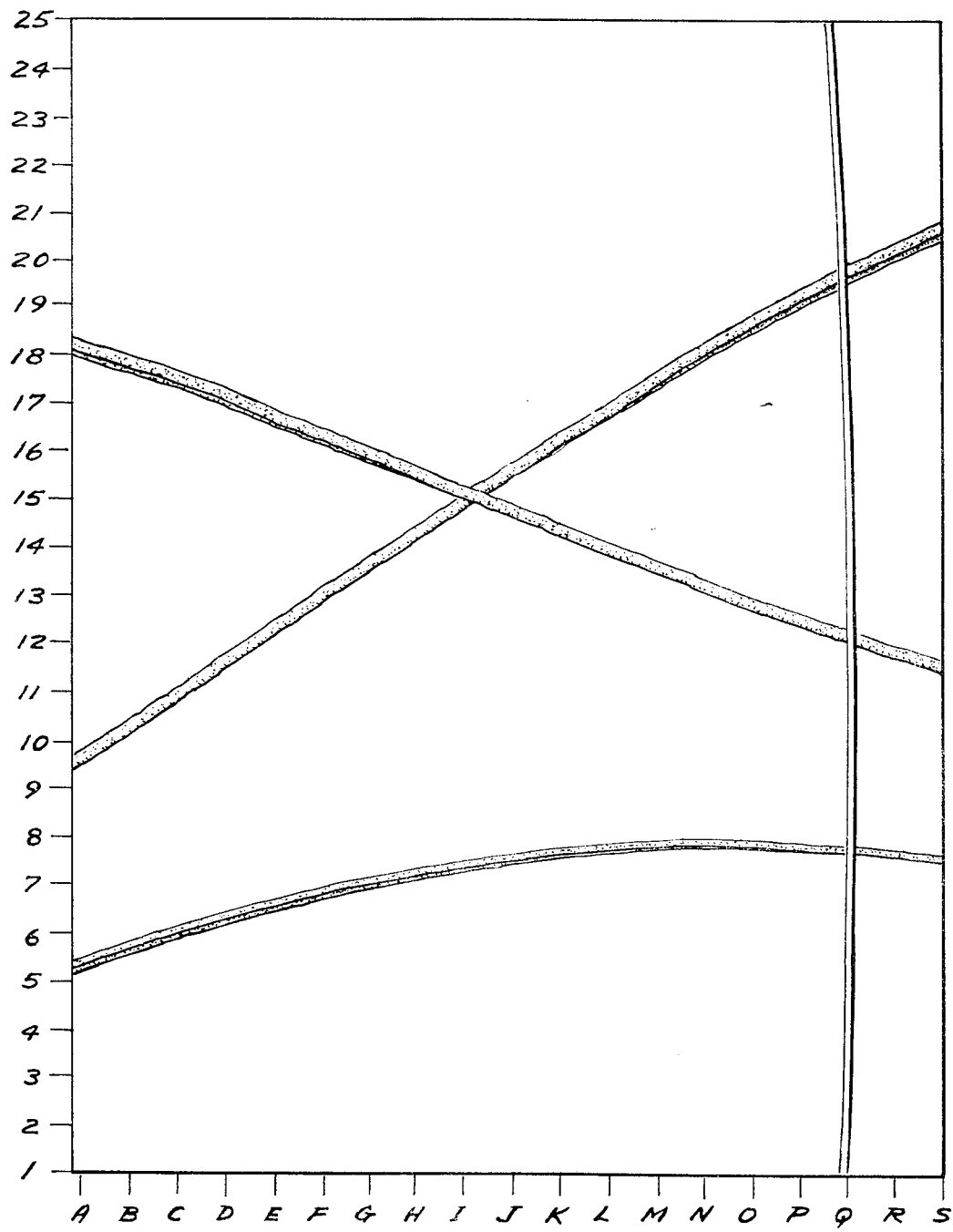

Referring to FIGURE 1, there is shown five typical fibrils. For taking the photograph from which FIGURE 1 was made, the fibrils were placed between glass slips, so that they could be held within the range of focus of the camera by which the photograph was taken. It will be noted that the fibrils bend and that they also twist. In the photograph from which FIGURE 1 was made, the magnification was 12 diameters. In FIGURE 2 there are illustrated three fibrils. At the coordinate P–Q vertically through this picture, there is shown a round wire of .001 inch diameter, for purposes of size comparison. It will thus be seen that the fibrils have one face which is slightly larger and one face slightly smaller than the .001 inch wire. Also notice that the fibrils, one beginning at A9 and continuing diagonally to S20 and the other extending from A5 to S7 illustrates the twist of the fibrils. For fibril A9–S20, the sheared face of the fibrils is foremost in fibril A9 and the original surface of the strip is the undersurface which is exhibited narrowly at J15 and becomes wider at R20. Note, also, the gentle bend and rotation (twist) of the fibril A9–S20. The sheared surfaces have somewhat the appearance of having been heated but it is not actually known if this occurs. Whether or not shearing in the ordinary sense takes place is not known. But it is known that the fibrils are produced without any significant development of chips, slivers, and burrs, although there are some adherent irregularities on the edges of the fibrils. The fibrils shown in FIGURE 2 have what appears to be flat or nearly flat faces and where the two uppermost fibrils cross at 115 the contact between the fibrils appears to be an edge-to-edge contact. It is easy to understand how in a mass of such fibrils as in FIGURES 4 and 5, there would inevitably occur every conceivable type of contact, especially if the mass is compacted with pressure. The photograph from which FIGURE 2 was made had a magnification of 80 diameters.

The photograph from which FIGURE 3 was made also had a magnification of 80 diameters, and stretching across this figure from C1 to O25 is a wire of .001 inch diameter, for purposes of size comparison. Most of the fibrils exhibit a slight bend and some twist, and are free, or substantially free, of chips, slivers, burrs, and surface irregularities. There is also generally shown the variety of types of contact which are experienced when the fibrils contact each other. Thus at G12 there is what appears to be substantially face-to-face contact whereas at K12–13 there appears to be an edge-to-edge contact.

FIGURES 4 and 5 were made from photographs at 12 diameters, and illustrate respectively a few (FIGURE 4) and a larger (FIGURE 5) number of fibrils. In each photograph from which FIGURES 4 and 5 were made the fibrils were held gently together by glass slips so as to bring a larger number of fibrils into the range of focus of the camera with which these pictures were taken. These FIGURES generally show the way the fibrils will twist and lie together with random contact of every conceivable type, and as the concentration of fibrils is increased, in FIGURE 5, a greater mass of intermingling can be achieved.

FIGURE 6 shows the cross section of the fibrils magnified one hundred sixty times and has been referred to in the previous description.

An exceedingly homogenous mixture of fibrils of different materials can be made by using different metals or materials for the strips S1–S5, which are then simultaneously severed to produce the fibril product. Also, different widths and thicknesses may be used simultaneously for strips S1–S5 by suitably constructing the underside of the pressure hold-down unit 82, to fit such widths and thicknesses of strip material.

As many widely apparently different embodiments of this invention may be made without departing from the spirit and scope thereof, it is to be understood that I do not limit myself to the specific embodiments disclosed herein.

What is claimed is:

1. The method of making metal fibrils which comprises simultaneously moving a plurality of strips of metal parallel to one another in the direction of their lengths on a planar supporting surface which sharply terminates at a supporting edge transverse to the length of the strips, closely supporting said strips by maintaining pressure on its upper surface substantially to the position of said supporting edge, when each strip is projected beyond said supporting edge striking the upper surface of each such projected strip with one of a succession of identical moveable tools each of which has a cooperating edge which passes with substantially zero clearance with respect to said supporting edge while being translated along a planar path of movement substantially normal to the plane of the strips at said supporting edge, for delivering a sharp massive blow of exceedingly short duration against that portion of each strip which is projected, for thereby severing from each strip with each such moveable tool a tiny fibril of metal having a length corresponding to the width of the strip and a cross-section which is the deformed remainder of the longitudinal section of the projected portion of the strip, the severing step including creating a flow of air to pneumatically convey the severed fibrils to a closed strip collection container and advancing the strips between the periods of the massive blows delivered by said succession of movable tools.

2. The method of claim 1 further characterized in that the severance blow is completed in about .00015 to .0003 second.

3. The method of claim 1 further characterized in that the strip is advanced a distance from about .0009 inch to about .003 inch.

4. The method of claim 1 further characterized in that the strips are of different materials for producing mixtures of fibrils.

References Cited

FOREIGN PATENTS 266,657 5/1950 Switzerland.
550,085 12/1942 Great Britain.

MILTON S. MEHR, Primary Examiner

U.S. Cl. X.R.

29—4.5; 225—4

PO-1050
(5/69)

UNITED STATES PATENT OFFICE
CERTIFICATE OF CORRECTION

Patent No. 3,504,516      Dated April 7, 1970

Inventor(s) Bertil J. Sundberg

It is certified that error appears in the above-identified patent and that said Letters Patent are hereby corrected as shown below:

Column 2, line 3, "produce" should be --produced--.
Column 4, line 39, "fibrls" should be --fibrils--.
Column 5, delete line 51 and insert --.0005 can be produced. The severed face E2 in Figure--. Column 6, line 42, after "contact" (second occurrence), insert a comma.

SIGNED AND
SEALED
AUG 11 1970

(SEAL)
Attest:

Edward M. Fletcher, Jr.
Attesting Officer

WILLIAM E. SCHUYLER, JR.
Commissioner of Patents